United States Patent [19]

Kagan et al.

[11] Patent Number: 5,717,898
[45] Date of Patent: *Feb. 10, 1998

[54] CACHE COHERENCY MECHANISM FOR MULTIPROCESSOR COMPUTER SYSTEMS

[75] Inventors: Michael Kagan; David Perlmutter, both of Haifa, Israel

[73] Assignee: Intel Corporation, Santa Clara, Calif.

[*] Notice: The term of this patent shall not extend beyond the expiration date of Pat. No. 5,301,298.

[21] Appl. No.: 438,615

[22] Filed: May 10, 1995

Related U.S. Application Data

[63] Continuation of Ser. No. 195,827, Feb. 10, 1994, abandoned, which is a continuation of Ser. No. 777,763, Oct. 11, 1991, abandoned.

[51] Int. Cl.⁶ .................................................. G06F 12/00
[52] U.S. Cl. .......................... 395/472; 395/471; 395/473
[58] Field of Search .................................. 395/468, 469, 395/471, 473, 470, 472

[56] References Cited

U.S. PATENT DOCUMENTS

| | | | |
|---|---|---|---|
| 3,723,976 | 3/1973 | Alvarez et al. | 395/417 |
| 4,484,267 | 11/1984 | Fletcher | 395/451 |
| 4,612,612 | 9/1986 | Woffinden et al. | 395/403 |
| 4,622,631 | 11/1986 | Frank et al. | 395/800 |
| 4,755,930 | 7/1988 | Wilson, Jr. et al. | 395/449 |
| 4,785,398 | 11/1988 | Joyce et al. | 395/403 |
| 4,847,804 | 7/1989 | Shaffer et al. | 395/446 |
| 4,939,641 | 7/1990 | Schwartz et al. | 395/473 |
| 4,991,081 | 2/1991 | Bosshart | 395/403 |
| 5,008,813 | 4/1991 | Crane et al. | 395/446 |
| 5,025,366 | 6/1991 | Baror | 395/455 |
| 5,113,510 | 5/1992 | Hillis | 395/448 |
| 5,140,681 | 8/1992 | Uchiyama et al. | 395/461 |
| 5,146,603 | 9/1992 | Frost et al. | 395/470 |
| 5,148,533 | 9/1992 | Joyce et al. | 395/471 |
| 5,179,675 | 1/1993 | Cole et al. | 395/403 |
| 5,301,298 | 4/1994 | Kagan et al. | 395/468 |
| 5,367,660 | 11/1994 | Gat et al. | 395/403 |
| 5,379,396 | 1/1995 | Gochman et al. | 395/468 |

FOREIGN PATENT DOCUMENTS

| | | |
|---|---|---|
| 0082949 | 11/1982 | European Pat. Off. . |
| 0232526 | 8/1987 | European Pat. Off. . |
| 0365117 | 4/1990 | European Pat. Off. . |
| 0439952 | 8/1991 | European Pat. Off. . |

OTHER PUBLICATIONS

Sweazey et al., *Cache Memory Requirements in RISC Computers*, Electro/87 and Mini/Micro Northeast Conference Record, Dec. 3, 1987, pp. 1–6, Los Angeles, CA USA.

Primary Examiner—Jack A. Lane
Attorney, Agent, or Firm—Blakely, Sokoloff, Taylor & Zafman

[57] ABSTRACT

A multiprocessor computer system which maintains cache coherency includes first and second microprocessors each having an associated cache memory storing lines of data. Each line of data has associated protocol bits that indicate a protocol state consistent with write-through, write-back, or write-once cache coherency policies that are selected via a protocol selection terminal for different system configurations. In one configuration, the output and external address terminals of the first microprocessor are coupled to the external and output address terminals, respectively, of the second microprocessor. This configuration enables each microprocessor to snoop memory cycles to main memory initiated by the other microprocessor so that it can be readily determined if a particular cache has the latest version of data.

33 Claims, 8 Drawing Sheets

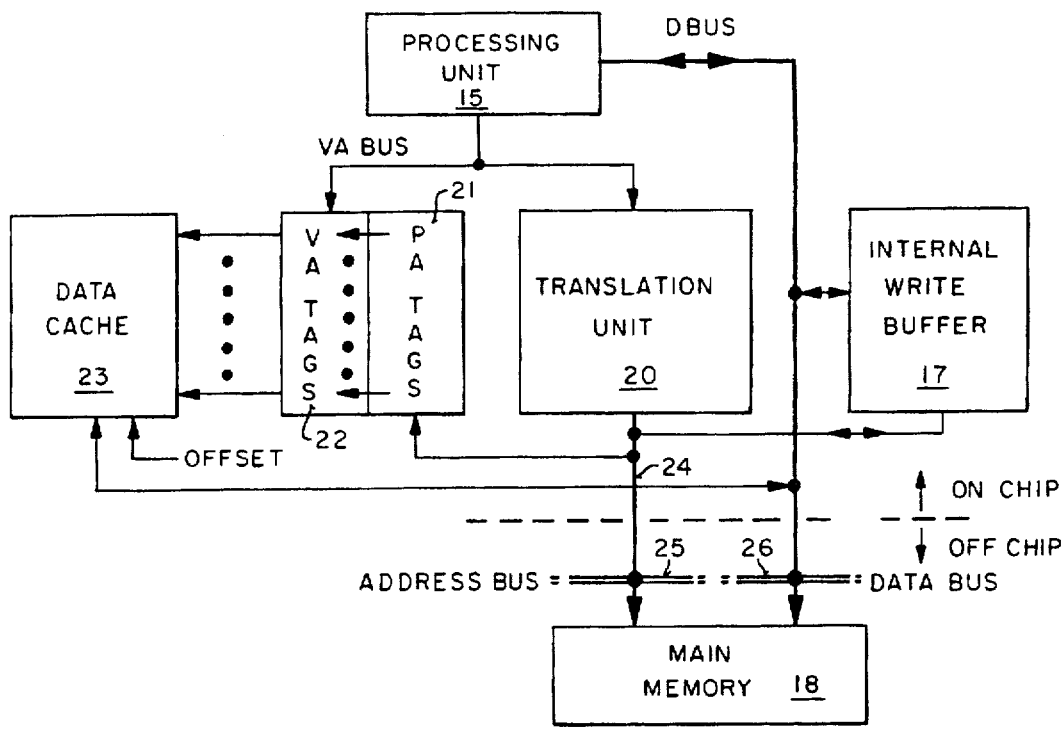
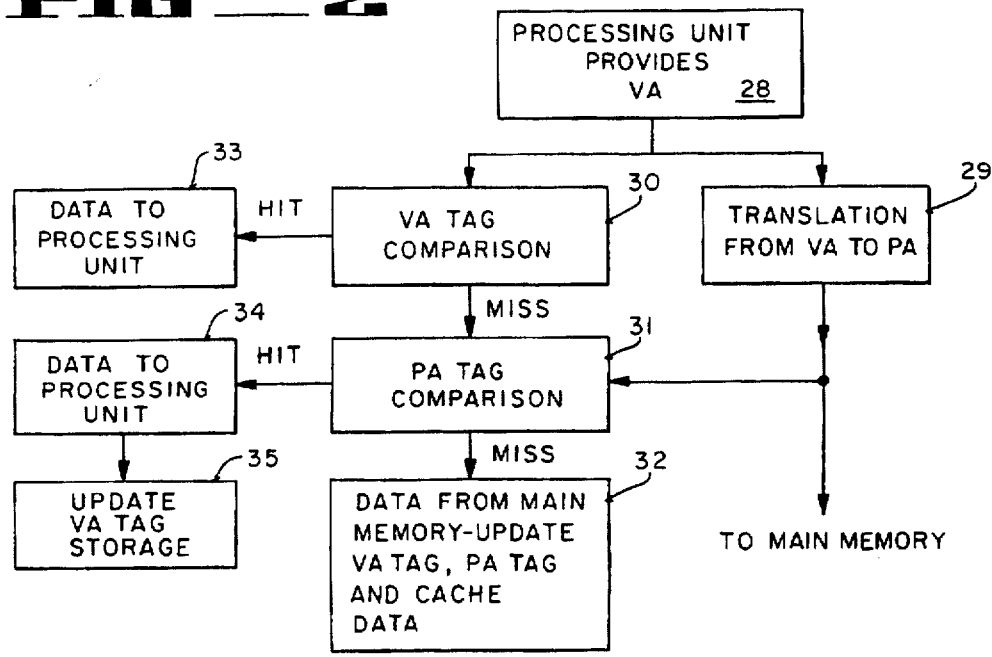

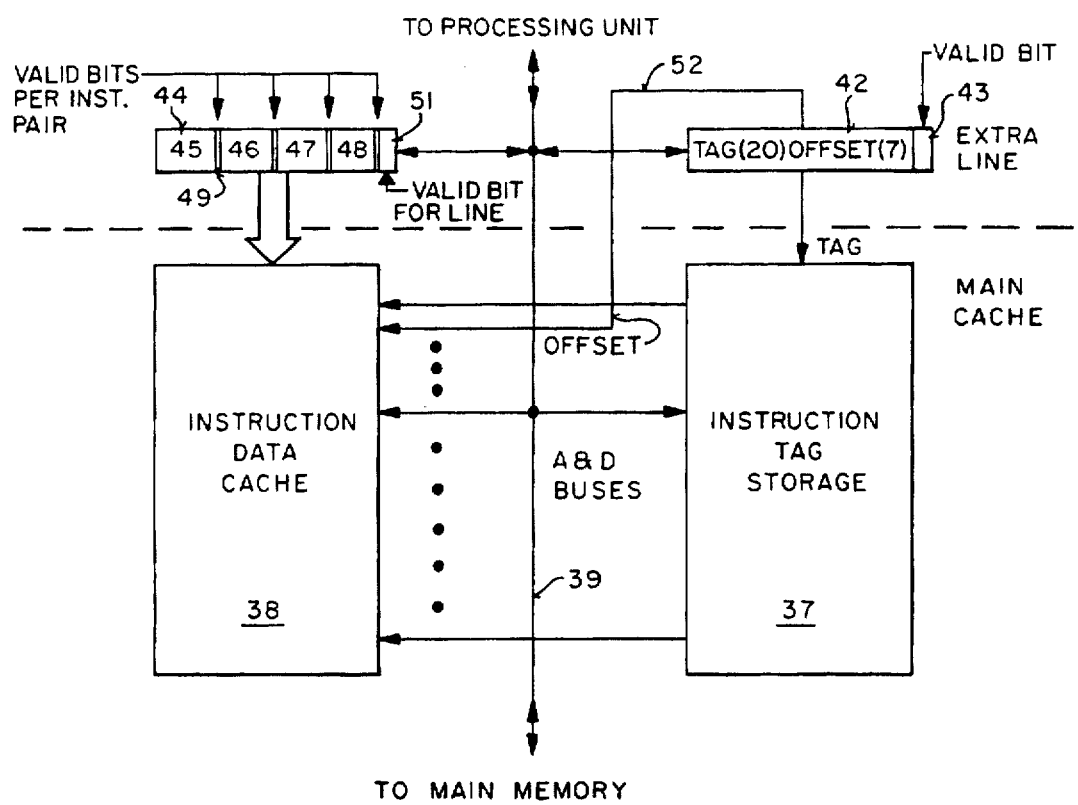
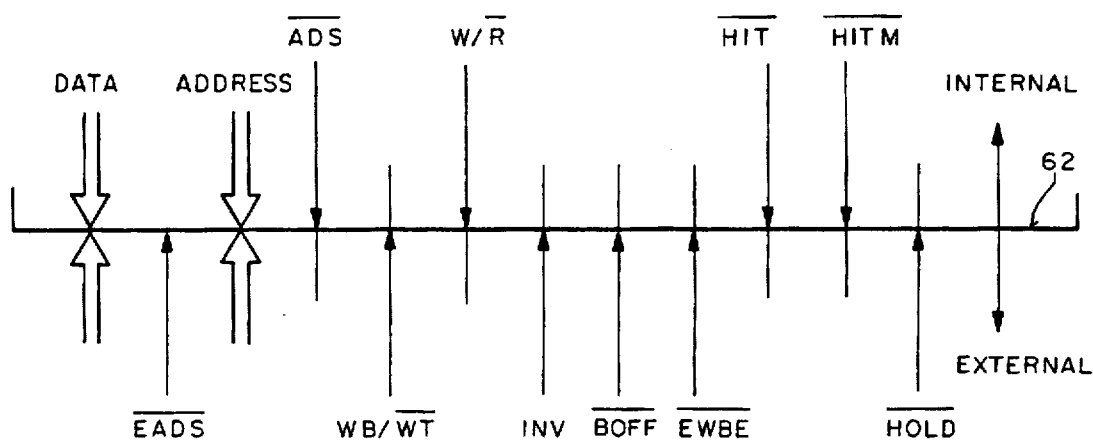

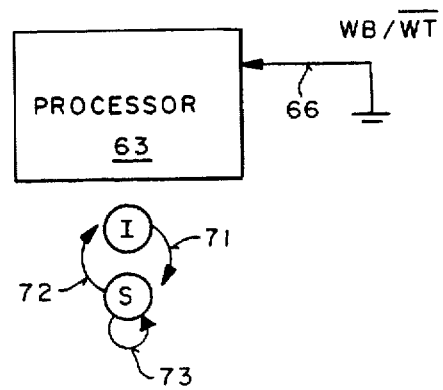
FIG_5
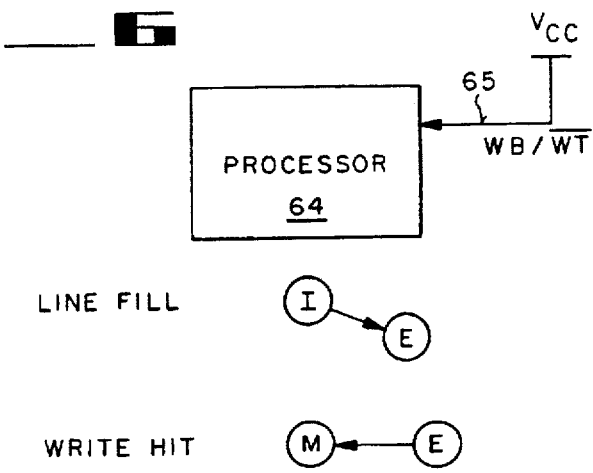
FIG_6
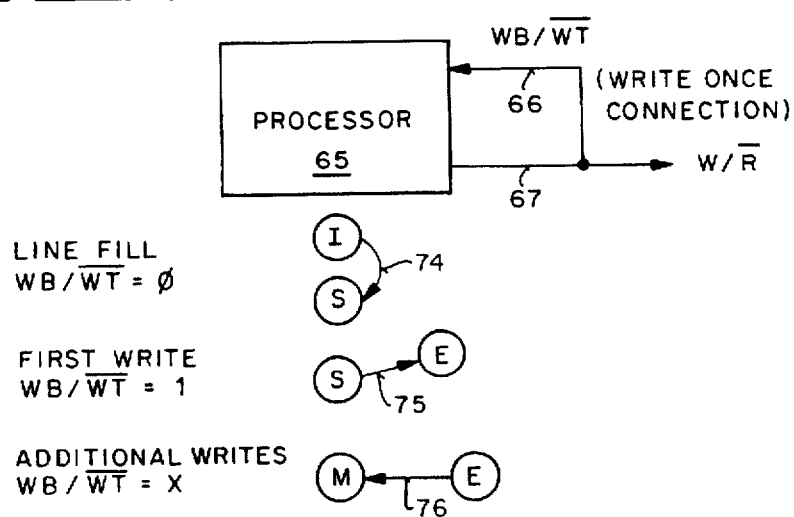
FIG_7

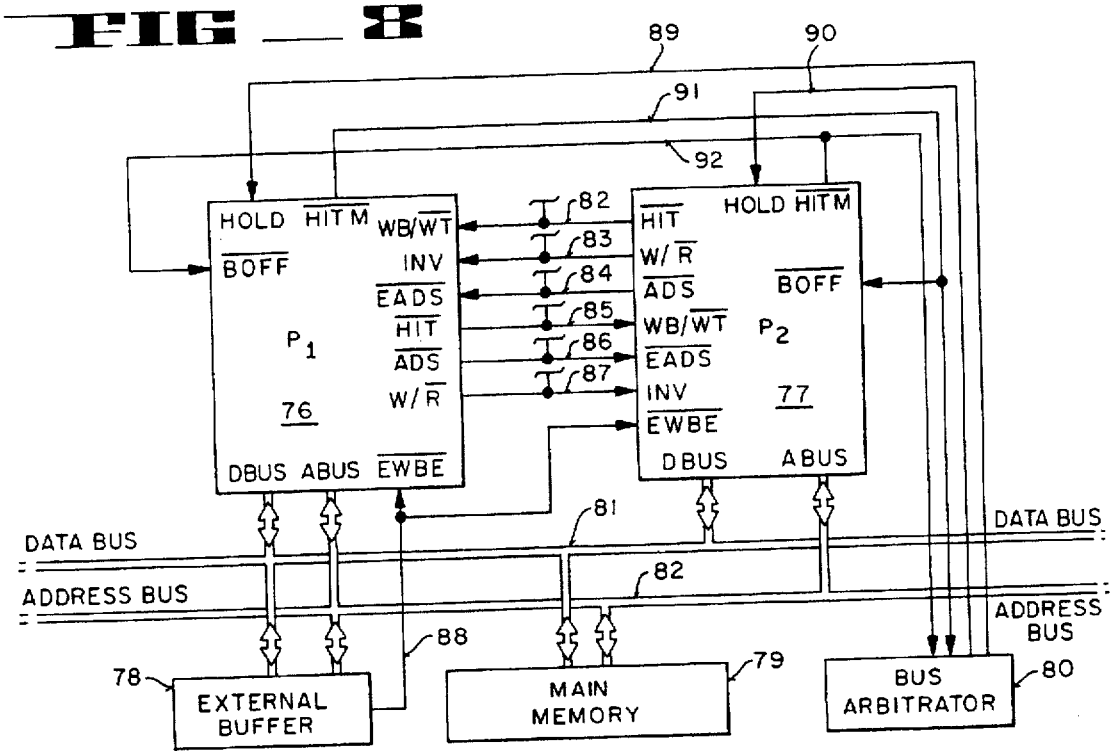
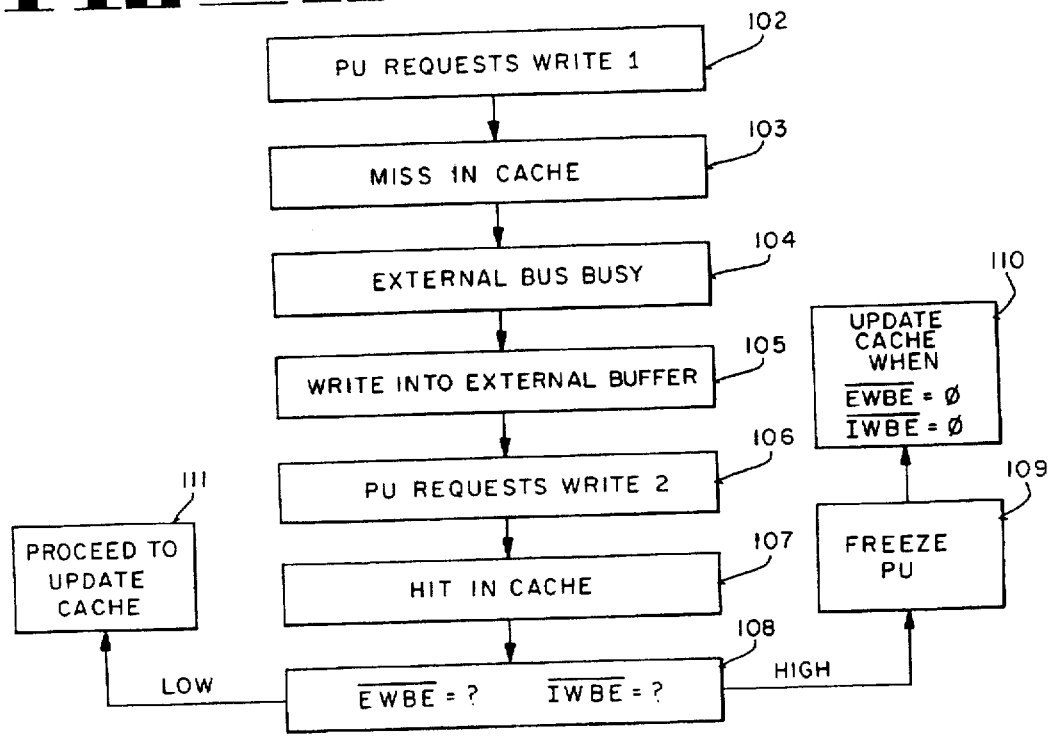

FIG_9
UPDATE FOR WRITE ONCE
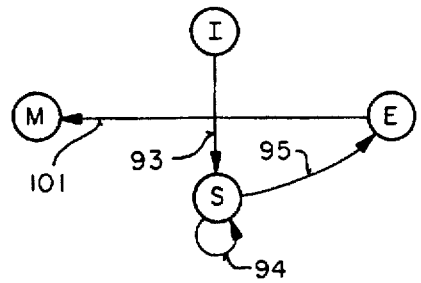
FIG_10A
SNOOPING
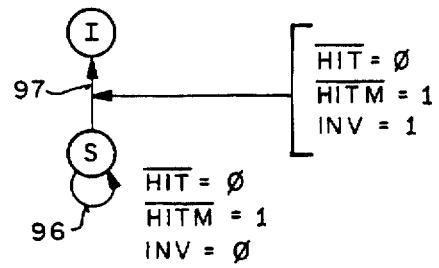
FIG_10B
SNOOPING
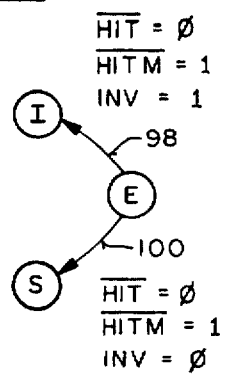
FIG_10C
SNOOPING
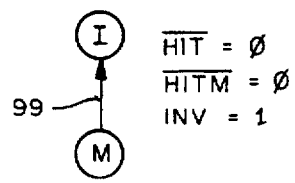

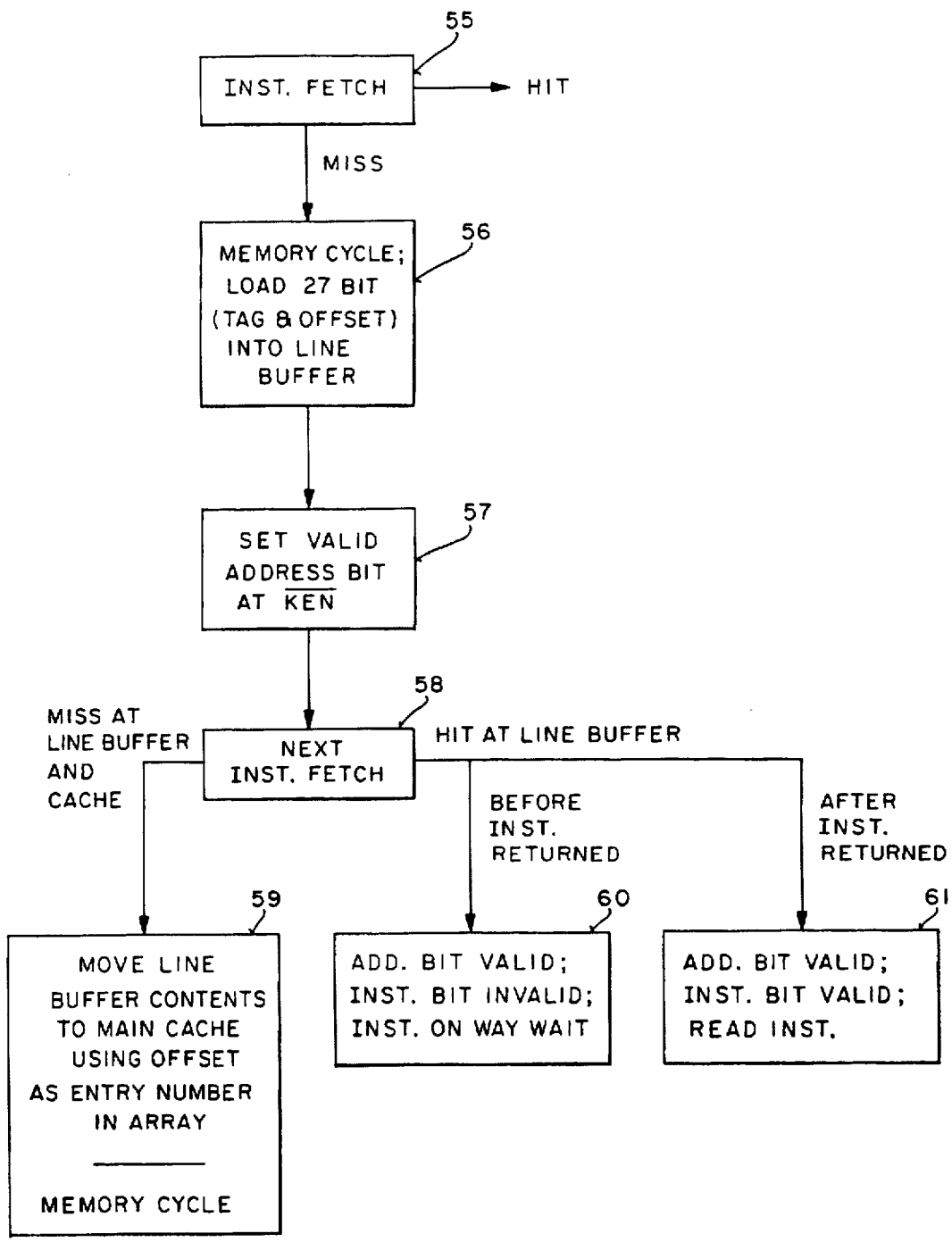

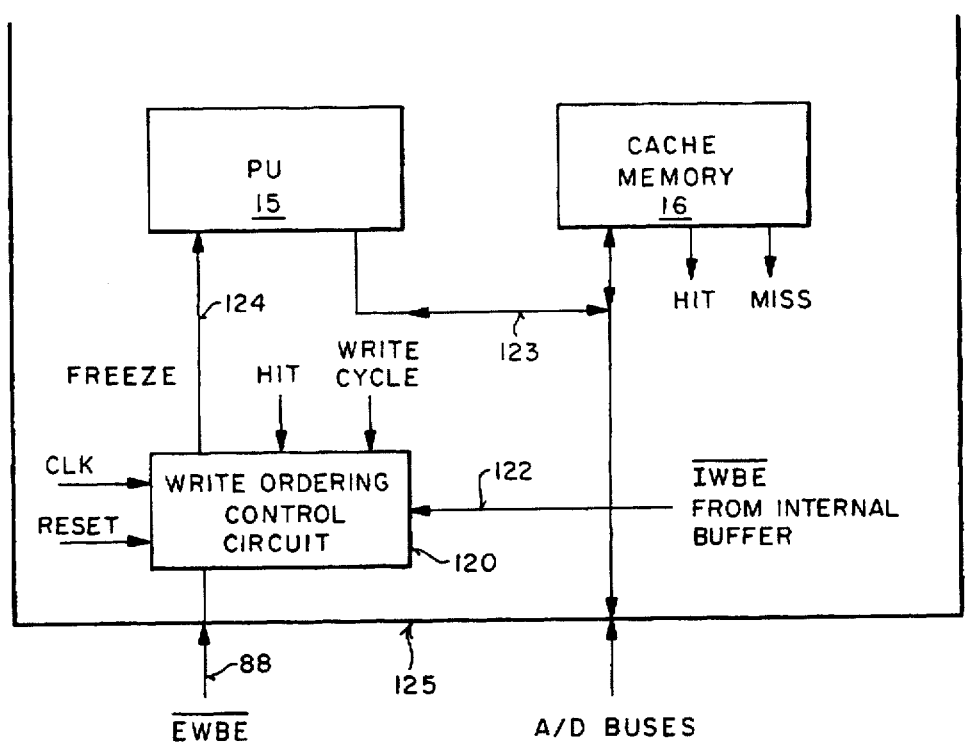
FIG_13

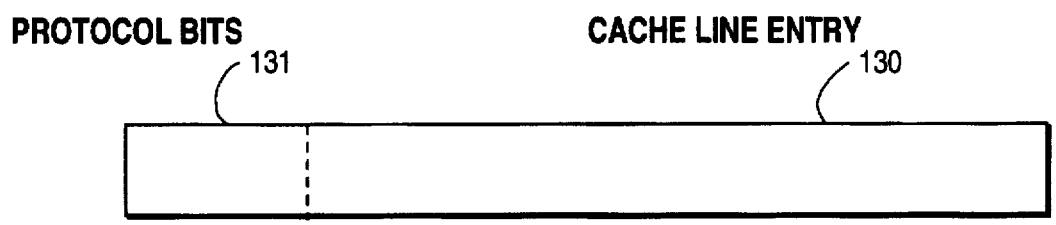
FIG_14

CACHE COHERENCY MECHANISM FOR MULTIPROCESSOR COMPUTER SYSTEMS

This is a continuation of application Ser. No. 08/195,827, filed Feb. 10, 1994, now abandoned, which is a continuation of application Ser. No. 07/777,763, filed Oct. 11, 1991, now abandoned.

BAGKGROUND OF THE INVENTION

1. Field of the Invention

The invention relates to the field of cache memories, particularly those which operate in a multiprocessor environment.

2. Prior Art

The present invention describes several improvements in a cache memory and related logic which is implemented in a RISC microprocessor. This RISC processor is an improved version of the commercially available Intel 860 processor. The improved cache memory and related logic is particularly applicable to a multiprocessor environment employing a shared bus.

The Intel 860 microprocessor, in addition to being commercially available, is described in numerous printed publications such as *i860 Microprocessor Architecture*, by Neal Margulls, published by Osborne McGraw-Hill, 1990.

The Intel 860 microprocessor and other microprocessors having cache memories, access these memories with virtual addresses from a processing unit. The virtual address is translated by a translation unit to a physical address, and if a miss occurs, an external memory cycle is initiated and the physical address is used to access main memory. Typically, it is more desirable to access the cache memory with virtual addresses since accessing can occur without waiting for the translation of the virtual addresses is to physical addresses.

In a multiprocessor or multitask environment, several virtual addresses may be mapped to a single physical address. While this does not present an insurmountable problem in the prior art, there are disadvantages in using the prior art virtual address-based cache memories in this environment. As will be seen the present invention describes a cache memory more suitable for the multiprocessor/multitask environment.

In organizing a cache memory, certain trade-offs are made between line size, tag field size, offset field size, etc. Most often these trade-offs result in a line size substantially wider than the data bus and typically a cache line contains several instructions. For instance, in the Intel 860 microprocessor, a cache line is 32 bytes, the data bus is 8 bytes and an instruction is 4 bytes. When a miss occurs for an instruction fetch, the processing unit must wait until an entire line of instructions (8 instructions) is received by the cache memory before instructions are provided from the cache memory to the processing unit. As will be seen, the present invention provides a line buffer which eliminates this waiting period.

There are numerous well-known protocols for providing cache coherency, particularly in a multiprocessor environment. Some processors which include cache memories (e.g., Intel 486) use a write-through protocol. When a write occurs to the cache memory, the write cycle "writes through" to the main memory. In this way, the main memory always has a true copy of the current data. (For this protocol, the cache memory classifies the data as either being invalid or, in the terms of this patent, "shared"). In other processors a deferred writing protocol is employed, such as the write-back protocol used in the Intel 860. Here the data in the cache memory is either classified as being invalid, exclusive or modified (dirty). Another protocol with deferred writing employed by some systems is a write-once protocol. With this protocol, data in the cache memory is classified as either invalid, exclusive, modified or shared. These protocols and variations thereof, are discussed in U.S. Pat. No. 4,755,930.

As will be seen, the present invention allows a user to select one of three protocols. A processor employing the present invention includes several terminals (pins) for interconnecting to other processors that enable cache coherency in a multiprocessor environment with a minimum of circuits external to the processors.

Maintaining the order of data written to main memory is often a problem, particularly where memory is accessed through a shared bus. Buffers are sometimes employed to store "writes" so that they may be written to main memory at convenient times. A problem with this is that some mechanism must be provided to assure that the data is written to main memory in the order it is generated. As will be seen, the present invention provides a mechanism which is adaptive in that it permits both strong ordering and weak ordering of writes based on certain conditions.

SUMMARY OF THE INVENTION

An improvement in a digital processor having a processing unit, a cache memory and a translation unit is described. The cache memory has a storage section for storing virtual address tag fields which are coupled to the cache memory from the processor. These virtual addresses are also coupled to the translation unit and are converted to physical addresses. The cache memory also includes a physical address tag storage section for storing the tag fields of physical addresses. The addresses from the translation unit and addresses from an external address bus (for "snooping") are coupled to this section. If a miss occurs for a virtual address, this address is translated and the corresponding physical address tag field is compared to the tag fields stored in the physical address tag section. If a match occurs there, the associated data (if valid) is provided and the virtual address tag storage section is updated with the virtual address tag field. If no match is found, the physical address is then used in an ordinary memory cycle to access the main memory.

Other aspects of the present invention will be apparent from the following detailed description of the invention.

BRIEF DESCRIPTION OF THE DRAWINGS

FIG. 1 is a block diagram of a portion of the invented cache memory showing its coupling to a processing unit, translation unit and main memory. The virtual tag storage and physical tag storage sections are shown in FIG. 1.

FIG. 2 is a flow diagram illustrating the logic implemented by the block diagram of FIG. 1.

FIG. 3 is a block diagram illustrating the line buffer employed in the cache memory of the present invention.

FIG. 4 is a diagram illustrating a processor interface and more particularly, some of the signals applied to and provided by the processor which includes the invented cache memory.

FIG. 5 illustrates the connection made to a terminal of a processor which includes the invented cache memory and a state diagram illustrating the implementation of a write-through protocol in the processor.

FIG. 6 illustrates the connection made to a terminal of a processor which includes the invented cache memory and state diagrams illustrating the implementation of a write-back protocol in the processor.

FIG. 7 illustrates the connection made to a terminal of a processor which includes the invented cache memory and state diagrams illustrating the implementation of a write-once protocol in the processor.

FIG. 8 illustrates two processors, each of which contain a cache memory in accordance with the present invention and their interconnection.

FIG. 9 is a state diagram used to describe the operation of the processors of FIG. 8.

FIG. 10a is a state diagram used to describe the operation of the processors of FIG. 8 for a snoop hit to the S state.

FIG. 10b is a state diagram used to describe the operation of the processors of FIG. 8 for a snoop hit to the E state.

FIG. 10c is a state diagram used to describe the operation of the processors of FIG. 8 for invalidating snoop hit to the E state.

FIG. 11 is a flow diagram illustrating the logic implemented in the block diagram of FIG. 13 for the strong ordering mode.

FIG. 12 is a flow diagram illustrating the logic implemented in the line buffer of FIG. 3.

FIG. 13 is a block diagram illustrating the cache memory and associated logic for the ordering modes.

FIG. 14 illustrates a cache line with bits indicating a protocol state.

DETAILED DESCRIPTION OF THE PRESENT INVENTION

An improved cache memory and associated logic is described. In the following description, numerous specific details are set forth, such as specific number of bits, in order to provide a thorough understanding of the present invention. It will be obvious, however, to one skilled in the art that the present invention may be practiced without these specific details. In other instances, well-known circuits have been shown in block diagram form in order not to unnecessarily obscure the present invention.

The word "data" is used throughout the application to indicate binary information. In some instances "data" is used in a somewhat generic sense to include, for example, constants, instructions or countless other fields stored in memories. In the currently preferred embodiment of the present invention, instructions (data) are stored separately in the cache memory from non-instruction data. This will be pointed out where appropriate.

The currently preferred embodiment of the invented cache memory is incorporated in a single chip, 64-bit RISC microprocessor. The processor may be realized employing well-known complementary metal-oxide-semiconductor (CMOS) technology or other technologies. This specific technology used to fabricate the processor is not critical to the present invention. Moreover, the present invention is directed to a cache memory suitable for use with a microprocessor. For the most part, only those portions of the processor which bear on the present invention are described.

As mentioned in the Prior Art section, the processor which incorporates the invented cache memory is an improved version of the Intel 860. Many of the inputs and outputs of this commercially available RISC processor are used in the processor which incorporates the cache memory of the present invention. Also as mentioned, an excellent reference describing the Intel 860 is *i860 Microprocessor Architecture*, by Neal Margulis, published by Osborne McGraw-Hill, 1990.

The invented cache memory is divided into a data (non-instruction) cache and an instruction cache. Both are four-way set associative with a line width of 32 bytes. Both store 16 kB of data. Each tag field is 20 bits; an offset field of 7 bits is used to form an entry number into the banks of data storage. As will be described later, both physical tags and virtual tags are stored for the non-instruction data storage. The physical tags are stored in a dual-ported storage array which allows examination of both addresses on an external bus (snooping) as well as physical addresses from the translation unit. The cells used in this array and the accompanying circuitry which permit a one cycle read/modify write cycle are described in co-pending application "Dual Port Static Memory with One Cycle Read-Modify-Write Operation", Ser. No. 458,985, filed Dec. 29, 1989, and assigned to the Assignee of the present invention. The remainder of the storage for the cache memory is realized with ordinary six transistor cells (static, flip-flop cells), except for the line buffer which uses master-slave cells. Both the virtual addresses and the physical addresses each comprise 32 bits as is the case with the Intel 860.

Overall Architecture of the Virtual and Physical Tag Storage and its Operation Referring to FIG. 1, a processing unit 15 is illustrated which may be the same as the processing unit found in prior art processors such as the Intel 860. This processing unit is coupled to a bidirectional data bus and to a virtual address bus. The data bus is coupled to an external data bus 26. Virtual addresses are coupled over the bus to the cache memory and to a translation unit 20. The tag fields of the addresses are coupled to a virtual address tag storage section 22. The offset fields of the addresses are coupled to the data cache 23. The offset fields provide entry numbers (line select) into the banks of the data cache 23. The index field is not shown. In addition to storing virtual tags, physical tags are also stored in a physical address tag storage section 21. Each physical tag is associated with its corresponding virtual tag.

The translation unit 20 translates the virtual addresses from the processing unit 15 into physical addresses in an ordinary manner. The output of the translation unit 20, bus 24, is coupled to an external address bus 25. The physical addresses (the tag field) is coupled to the physical address tag storage section 21.

As shown in FIG. 1, the main memory 18, address bus 25 and data bus 26 are "off chip" that is, they are not formed on the single substrate with the remainder of the processor, in the currently preferred embodiment. As is the case with the Intel 860, the cache memory 23, processing unit 15, translation unit 20 and other units are formed on a single substrate.

In operation, when the processing unit 15 requests data, the virtual address for the data is sent to the tag storage section 22. Assume that a match does not occur between the tag field from the processing unit and the tag fields stored in storage 22, resulting in a miss condition. Simultaneously with the comparison process in the tag storage section 22, the translation unit 20 translates the virtual address into a physical address. The tag field of the physical address is then coupled to the tag storage section 21 (for non-instruction data). Again, it is compared with each of the physical tag fields stored in the tag storage section 21. Assuming again that there is no match and that a miss condition occurs, a read memory cycle is initiated and the physical address is used to access the main memory 18. If the data sought is "cacheable", then the corresponding virtual address and physical address for the data is stored in the sections 22 and 21, respectively, and the data from main memory 18 is stored in the data cache 23.

Referring to FIG. 2, assume again that the processing unit provides a virtual address as indicated by block 28. This address is again coupled to the virtual address tag storage section 22. As indicated by block 30, the 20 bit tag field of the virtual address from the processing unit 15 is compared with the 20 bit tag fields stored in the virtual address tag storage section 22 as indicated by block 30. If a match occurs, then, as indicated by block 33, the data (if valid) is obtained from the data cache 23 in an ordinary manner using the offset and index bits as is well-known in the art. While the comparison is occurring for the virtual tags, the translation unit 20 is translating the virtual address to a physical address as indicated by block 29 in FIG. 2. The tag field of the physical address is coupled to the physical address tag storage section 21 and compared to the 20 bit tag fields stored there. If a miss occurred for the virtual tag, but a hit occurs for the physical tag, the data is selected from the data cache 23 based on the hit in the physical tag section again using the offset and index bits. (These bits are the same for the virtual and physical address.) Also for this condition, as indicated by block 35, the virtual address tag field is placed into the virtual address tag storage section 22 in a location that corresponds to the tag field of the physical address that produced the hit.

If a miss occurs both for the virtual and physical tags, an ordinary memory cycle is initiated and data is read from the main memory 18. If the data is cacheable, then as indicated by block 32, the virtual address tag storage section 22 and physical address tag storage section 21, in addition to the data itself, are updated.

When there is a task/context change for the processor, all the virtual tags in section 22 are invalidated. The data in the cache 23 as well as the physical tags in section 21 remain. The translation unit 20 is typically reprogrammed at this time with the mapping for the new task. When the processing unit 15 next generates a virtual address, no hit is possible within section 22. However, a hit is possible within section 21 and if one occurs, the data is provided from the data cache 23, and the tag field for the virtual address is loaded into section 22 in the location corresponding to the physical tag field that produced the bit.

Where more than one task is run on a processor, it is not unusual for a single physical address to have more than one corresponding virtual address. Thus, when there is a change from one task to another, a different virtual address may be requesting data previously stored in the data cache 23 in association with another virtual address. Since the physical tags are compared, the data will be found in the cache 23 without resorting to the main memory 18.

Another advantage to the memory cache shown in FIG. 1, particularly for multiprocessor applications, is that physical addresses on the external address bus 25 can be compared to the tags within section 21 and it can be readily determined as will be discussed later, whether a particular cache has the latest version of data. The physical tag section 21 is a dual ported storage array making it possible to snoop while performing the function described above.

Line Buffer

The use of the virtual and physical tag fields as discussed in conjunction with FIG. 1, in the currently preferred embodiment, is used only with the non-instruction data section of the cache memory. It could, however, be used for the instruction storage section. The line buffer improvement illustrated in FIG. 3 on the other hand, is used in conjunction with the instruction storage and not for the non-instruction data storage, although once again it could be used for non-instruction data storage.

Before describing the line buffer of FIG. 3, it is helpful to review what happens when the processing unit seeks to fetch an instruction and a miss occurs at the cache memory. For the described cache memory, each line of data is 32 bytes wide corresponding to 8 instructions. When the miss occurs, an entire line in the cache memory is filled, and then, the processing unit is able to retrieve the instruction (4 bytes) that it requested in that line. Consequently, once the miss occurs, it may be necessary that more bytes be transferred into the cache memory than are immediately needed before the processor is able to retrieve the instruction it requested.

The line buffer shown in FIG. 3 relieves this problem. The portion of the cache memory shown below the dotted line of FIG. 3 reflects the ordinary cache memory which includes instruction data cache 38 (similar to cache 23, except for instruction storage) and instruction tag storage section 37. The tag fields of the virtual address from the processing unit are coupled to the instruction tag storage section and compared in an ordinary manner with the stored tag fields. If a match occurs, one of the lines selected by the offset provides the instruction in an ordinary manner. Note, as is typically the case, the offset is provided to cache 38 allowing it to select the appropriate lines at the same time that the comparison process is being carried out in the tag storage section 37.

With the invented line buffer, in effect, an additional one line cache memory is added which is fully associative and additionally where fields of the data stored in the single line of data can be selected without the remainder of the line being present. The line buffer comprises a first storage unit 42 for storing a virtual address (27 bits and at least one additional bit as described below) and a second storage unit 44 for storing the data (32 bytes plus additional bits which will be described).

The storage unit 42 and 44 in the currently preferred embodiment are fabricated using master-slave flip-flops which are well-known in the art. This arrangement permits reading and writing in a single memory cycle which, as will be seen, enables for instance, address and data to be read from the storage unit 42 and 44 and new address and data to be read into the line buffer in a single cycle.

The storage unit 42 stores both the tag field (20 bits) and the offset field (7 bits). This is in contrast to the storage section 37 where only the 20 bit tag field is stored. When the processing unit seeks an instruction from the cache memory, not only does the comparison occur of the tag fields within the storage 37, but also both the tag and offset fields from the processing unit are compared to the tag and offset fields stored within the storage unit 42. Ordinary comparison devices are included in storage unit 42 for this purpose. C The storage unit 42 includes an additional bit 43, a "valid bit". If a miss occurs, as will be described in greater detail, the contents of the storage unit 42 (tag portion only) is transferred to storage section 37 and the offset is used to select lines within the cache 38. Then the data in storage unit 44 is transferred into the cache 38. The tag and offset fields from the processing unit are then loaded into the storage unit 42. The valid bit at this time is set to invalid. An ordinary memory cycle is used now to access the main memory.

When the main memory returns a signal indicating that the data being accessed in the main memory is "cacheable" the valid bit 43 is set to its valid state. The signal indicating that the processing unit has requested cacheable data is identified as KEN/; this signal is currently used in the Intel 860, however, not with a line buffer. The use of this valid bit is described in conjunction with FIG. 12.

The storage unit 44 is divided into four sections, each 64 bits wide. In addition, each of the sections includes an additional bit used to indicate if the data in its respective section is valid. For example, 8 bytes (2 instructions) are stored in the section 45. The bit 49 is used to indicate if the data in section 45 is valid. Similarly, there are bits associated with the sections 46, 47 and 48; there is one additional bit 51, used to indicate the validity of the entire line. This bit corresponds to the valid bits used in cache 38.

In the currently preferred embodiment, the data bus is 64 bits wide and hence, for each memory cycle a single section of the storage unit 44 is filled. Assuming that data is loaded into the storage unit 44 from left to right for a typical line fill, first the storage section 45 is filled on a first memory cycle and the valid bit 49 is set to its valid state. All the other valid bits associated with the storage unit 44 remain in their invalid state. As more memory cycles occur, loading data into sections 44, 47 and 48, the associated valid bits for each of these sections change to their valid state. Once all the sections have valid data, the bit 51 is set to its valid state.

Data may be transferred, as will be discussed, from the first storage unit 44 into the cache 38. When a transfer occurs the offset field from storage unit 42 is used as an entry number into cache 38 and the data from storage unit 44 is transferred into cache 38. Only the final valid bit 51 is stored within cache 38. As will be discussed, even if for example, only sections 45 and 46 have data, a transfer of the data to cache 38 can occur. Thereafter, on the next two memory cycles the data for the remaining half of the line is directly transferred into cache 38.

Importantly, the processing unit is able to read data from storage unit 44 before the entire line fill occurs. After a first memory cycle where, for instance, section 45 receives two instructions from main memory, invalid bit 49 is set to its valid state. The processing unit through the use of the index field of the virtual address selects one or both of the instructions from section 45 and hence continues operating, even though the remaining sections 46, 47 and 48 have not been filled with instructions from main memory. This is in contrast to filling the entire line in cache 38 before such accessing is possible with the prior art. In effect, one may look at this as a "fifth way" set associativity.

Referring now to FIG. 12, assume that the processing unit seeks to read an instruction as shown by block 55. The address (both tag and offset fields) for this instruction are coupled to the storage unit 42 of FIG. 3 and compared with the contents of the storage unit 42. Simultaneously, the tag field for the instruction, in an ordinary manner, is compared with the tag fields stored within section 37 while the offset field selects lines in cache 38. A hit can occur either within the section 37 or the storage unit 42. If a hit occurs within section 37, the instruction is provided in an ordinary manner from the cache 38. If the hit occurs because of the contents of the storage unit 42 (both the tag and offset fields must match) then the appropriate data is selected from storage unit 44, of course, assuming it is valid.

Assume that the fetch illustrated by block 55 results in a miss both in the storage unit 42 and section 37. This miss causes an external memory cycle to be initiated, that is, the processor seeks to obtain the instruction from main memory. While this is occurring the valid contents, if any, of storage unit 42 are moved from the storage unit. (In fact, the contents of the line buffer are written to cache while doing the next linefill of the line buffer). The tag field is transferred to section 37 and replaces a tag field stored within section 37 under a predetermined replacement algorithm (e.g., random replacement). The offset field from the storage unit cans 42 provides the entry number to allow the data from the storage unit 44 to be transferred to cache 38. The tag and offset fields of the address that caused the miss are then transferred into the storage unit 42. This is shown by block 56.

Assume now that the address loaded into storage unit 42 is cacheable; once the KEN signal has been returned, the bit 43 is set to its valid state. If the data sought is not cacheable, on the next miss the new address is loaded into the storage unit 42 and its previous contents discarded.

Once the data is returned from main memory, and is loaded into at least one of the sections of the storage unit 44 it is available to the processing unit, as previously discussed. Typically in processor operation because of the pipelining, the next instruction will be fetched before the previous instruction has been returned from main memory. This is shown by block 58 in FIG. 12. Two possible conditions are shown once this next instruction fetch occurs. One is a hit at the line buffer and the second is a miss at the line buffer. Another possibility is that a hit occurs within section 37 and in this event the instruction is selected from storage 38 after the previous instruction is returned from main memory.

Assume now that a miss occurs at the line buffer. As shown by block 59, the data contents, if any, are moved to the cache 38 with the offset field from the storage unit 42 providing an entry number as previously discussed and with a tag field from storage unit 42 being entered into section 37. This clears the way for the new instruction address to be placed into storage unit 42. An external memory cycle is initiated and the new data, once returned from main memory, is placed within the storage unit 44.

If a hit occurs in the line buffer for the next instruction fetch, such hit could occur either before or after the previous instruction has been returned. If it occurs before the previous instruction has been returned as indicated by block 60, the following indicators are present: the address valid bit 43 is in its valid state and the valid bit associated with the previously requested instruction is in its invalid state. Under these conditions, the processing unit knows that the previous instruction is on its way from main memory and that it should wait for the instruction as indicated by block 60. If, on the other hand, the hit occurs after the previous instruction has been returned, the valid bit associated with the instruction, for example bit 49, is in its valid state and the processing unit can read the instruction from the storage unit 44 once the previous instruction has been, of course, taken by the processor.

Thus, the line buffer of FIG. 3 permits the processing unit to proceed before an entire line fill occurs and thereby saves the time normally associated with filling an entire line in a cache memory.

Implementation of Cache Coherency Protocols

In the following description, the known protocols write-through, write-back and write-once are discussed. In this connection the letters "M", "E", "S" and "I" are used; sometimes these letters are referred to collectively as MESI. For the write-once protocol "I" indicates that the data is invalid, "S" indicates that the data is shared, for example, that the data in addition to being in main memory, is in another cache memory. "E" indicates that the data is exclusive, that is, it is in only one cache memory and main memory and not in other cache memories. "M" indicates that the data is modified, and that the data in main memory is incorrect. As currently implemented, and as shown in FIG. 14, each line of data 130 includes protocol bits 131 that indicate one of the four protocol states "M", "E", "S", "T". For the write-through protocol only the "T" and "S" states are used; for the write-back protocol the "T", "E" and "M" states are used.

Importantly, as will be seen, the processor can implement any one of the three protocols. FIG. 8 shows two processors interconnected, as can be done with the present invention, to provide a write-once protocol. In this regard, there are several terminals or pins associated with the processors which are not found on the Intel 860.

Referring first to FIG. 4, the processor terminals and the signals on these terminals, insofar as they are needed to understand the various protocols are shown. Line 62 is intended to be the demarcation between the processor (chip) and its external environment. Hence, above the line 62 is internal to the processor and below the line external to the processor.

Beginning at the far left, the bidirectional data bus is shown. Also, there is a bidirectional address bus; this bus, as mentioned, is able to sense addresses on the external address bus and for this reason is bidirectional. There are two address strobes, EADS\ and ADS\. When the EADS signal is low, the external addresses are valid. Similarly, when the ADS signal is low, the internal addresses are valid.

A protocol selecting terminal is provided which permits selecting of the protocols. This terminal is identified as WB/WT\ (write-back/not write-through). The connections made to this terminal are described later.

The commonly used signal which indicates whether a memory cycle is a write or read cycle (W/R\) is also shown in FIG. 4 since it is subsequently discussed.

The processor receives a signal which indicates to the processor that it should invalidate data. This signal is shown as "INV". When the processor is sensing external addresses (snooping) if this signal is high the processor places the corresponding data (if found in its cache memory) in the invalid "I" state.

The "BOFF\" signal, when applied to the processor, causes the processor to back off from completing a memory cycle. The use of this signal is described later.

The processor receives the EWBE\ signal, "external write buffer not empty". This signal is low when the external right buffer is empty.

The HIT\ signal is provided by the processor when a hit occurs for an externally sensed address. This signal is nominally high and drops in potential when a hit occurs and the corresponding data is in the "E", "S", or "M" states. The HITM\ signal drops in potential when a hit occurs for an externally sensed address and the corresponding data is in the "M" state. Thus, if the processor is snooping and the corresponding data is in the "M" state, both the HIT\ and HITM\ signals drop in potential.

Finally, the HOLD\ signal causes the processor to, in effect, halt operations. This is used in connection with a bus arbitrator and shall be described in conjunction with FIG. 8.

In the following discussion, the states of the bits representing "M", "E", "S" and "T", for the different protocols are discussed along with the conditions under which they change. This is illustrated in terms of state diagrams rather than, for example, gates. This is done to provide a clearer understanding of the present invention. It will be obvious to one skilled in the art that ordinary logic may be used to implement the state diagrams.

FIGS. 5, 6 and 7 show the connection made to the WB/WT\ terminal to obtain the different protocols. These figures apply to a case where a single processor is used in a system.

Referring first to FIG. 5, assume that the processor 63, which contains the invented cache memory and its associated logic, has its WB/WT\ terminal connected to ground. This implies that write-through is true and hence, that the write-through protocol is implemented. For the write-through protocol, the data is either in the invalid (I) state or the shared (S) state which, for a single processor environment indicates that the data in the cache memory is valid. With the ground potential coupled to line 66, the cache memory only associates the "T" or "S" state with each line of data. If the processor initiates a read cycle, the data read into the cache memory is valid as indicated by the change of state from "T" to "S" (arrow 71) shown in FIG. 5. If the processor reads the data from the cache memory, the data remains in the "S" state as indicated by arrow 73. The data can be invalidated as indicated by arrow 72 by, for example, the purging of data from the cache memory.

Referring to FIG. 6, the processor 64 is shown which may be identical to processor 63 except that its WB/WT\ terminal is connected to $V_{cc}$ (e.g., 5 volts) by line 65. This implies that the write-back protocol is in use and that therefore, for each line of data, the bits indicating "T", "E" or "M" apply. When a line fill occurs, the state changes from invalid to "E" indicating that the processor has as good a copy as is found in the main memory. If a write hit occurs, the state changes from "E" to "M". The states and their transitions for the write-back protocol are as currently used in the Intel 860.

Referring to FIG. 7, the processor 65 which again may be identical to the processors 63 or 64 is shown. This time the WB/WT\ terminal is connected to line 67 by line 66, line 66 being the W/R\ terminal. This connection provides the write-once protocol. For example, after every line fill, the line will be in the "S" state because W/R\ is low for read cycles. This is shown in FIG. 7 by arrow 74 and corresponds to the arrow 71 of FIG. 5 where line 66 is connected to a low potential (ground). The subsequent write to this line will be write-through's to main memory because of the "S" state. When doing the first write, the processors samples the WB/WT\ terminal and determines that it is high because of the write cycle and changes state to the "E" state as shown by arrow 75 (write-once). All subsequent writes to this line will not show up on the bus because of the change to the "M" state as shown by arrow 76. Consequently, the write-once protocol is realized.

Referring now to FIG. 8, two processors 76 (P1) and 77 (P2) are shown coupled to a shared data bus 81 and a shared address bus 82. The processors 76 and 77 may be identical to the previously discussed processors, that is they include the cache memory of the present invention and its associated logic.

The shared bus 81 and 82 are coupled to main memory 79 and an external write buffer 78 which shall be subsequently described.

In FIG. 8 the various interconnections for the processor 76 and 77 are illustrated that implement write-once protocol for shared data (HIT\ asserted for snooping processor while the other processor is doing a linefill). As will be seen, these interconnections permit the coherent caching with a minimum of glue logic.

As shown by lines 84 and 86, the output address strobe terminal (ADS) from one processor is coupled to the external address strobe terminal of the other processor. This assures that each of the processors snoops on each others cycles. That is, when processor P1 puts out an address on bus 81, the ADS strobe signal on line 86 causes processor 77 to read the address. Note that this strobe signal may be coupled to other components in the system such as the buffer 78 and memory 79.

This HIT\ terminal of one processor is coupled to the WB/WT\ terminal of the other processor by lines 82 and 85. This assures that when one processor is reading data to fill a line in its cache memory, and the other processor has the same data, the processors will indicate that the data is in the "S" state. This does not occur if the HITM signal is low as will be described later in conjunction with the BOFF\ signal.

Assume that processor 76 is reading a line of data from main memory for its cache memory and that that line is also present in processor 77. Assume further that the line is processor 77 is in the "E" state. The hit signal on line 82 drops in potential causing the data read into processor 76 to be in the "S" state as shown by line 93 of FIG. 9. In the case of processor 77 which is snooping, the "E" state changes to the "S" state as indicated by line 100 of FIG. 10b. For the processor 77 the HIT\ signal is low indicating that the data is present in the processor 77. However, the HITM\ signal is high since the data is not in the "M" state. Also, since this is a read cycle by processor 76 the invalid signal on line 87 remains low. Consequently, both processors will indicate the data is in the "S" state, that is the data is shared by the cache memories.

The W/R signal of one processor is connected to the INV terminal of the other processor. This ensures invalidation of the data in one processor while the other processor is writing. Lines 83 and 87 of FIG. 8 accomplish this.

Assume that processor 76 is writing and that data for that address is found in processor 77. The signal on line 87 will be high, causing the corresponding data in processor 77 to assume the "I" state. This is shown in FIG. 10a by arrow 97, in FIG. 10b by arrow 98 and in FIG. 10c by arrow 99. Also as shown in FIG. 10a, when the data in the processor 77 is in the "S" state for the described conditions, the HIT\ signal will be low and the HITM\ signal will be high since the data in the cache memory is in the "S" state, not "M" state. In FIG. 10b, when the data is in the "E" state, it also changes to the "I" state as indicated by arrow 98, once again the HIT\ signal is high. A transition occurs from the "M" to "S" state if the INV pin is active with EADS.

In FIG. 10c if the data in processor 77 happens to be in the "M" state, as indicated by arrow 99, it is invalidated. Note that the HIT\ and HITM signal are both in their low states.

When a processor is snooping and senses that another processor is reading data, if the processor is already in the "S" state, it remains in the "S" state as shown by arrow 76 of FIG. 10a. Here the snooping processor indicates that a hit occurred and that the data is not in its modified state.

As shown in FIG. 8, the HITM\ terminal of one processor is coupled to the back-off terminal of the other processor and also to the bus arbitrator by lines 91 and 92. This assures that when one processor contains modified data, the other processor is prevented from reading invalid data from the main memory. For example, if processor 76 contains modified data, the data at the corresponding address in the main memory 79 is incorrect. If processor 77 should attempt to read that data, the HITM\ signal on line 91 will go low causing the processor 77 to back off. This will be explained later.

The remainder of FIG. 9 shows the standard updating for the write-once protocol for a processor, such as either processor 76 or 77 as it reads and writes. As indicated by the arrow 94, once in the "S" state, a processor may read from its cache memory without changing the "S" state. As indicated by arrow 95, once a processor writes to its cache (first write) the state changes to "E" and the data is read into the main memory. When another write occurs to that location, it changes state to the "M" state as indicated by arrow 101 indicating that the only true copy of the data is contained in the cache memory. This "M" state and in particular, the HITM signal prevents the other processor from reading the incorrect data from the main memory.

Assume for sake of discussion that processor 76 contains data in the "M" state and that processor 77 seeks to read data at that address from main memory 79. Processor 76 is in the snoop mode at this time and recognizes the address on the main bus. Both its HIT\ and HITM\ drop in potential. This signals the processor 77 that the main memory is out of date. Specifically, the signal on line 91 forces processor 77 to back off, and not to read the data from main memory. The bus arbitrator 80 which is coupled to lines 91 and 92 senses the signal on line 91 and knows that it must allow the data to be flushed from processor 76 before processor 77 can read. The bus arbitrator 80 nominally, through the hold terminals of both processors, allows them to proceed. However, under certain conditions, such as described above, the arbitrator 80 holds one processor, allowing the other to go forward. Here the arbitrator holds processor 77 allowing processor 76 to update the main memory 79. Then the processor 77 is released allowing it to read the data it is seeking from main memory.

The bus arbitrator 80 typically performs other well-known functions, however, for purposes of the present invention, only its function as it relates to the present invention is described.

Strong Ordering and Weak Ordering of Writes to Main Memory

The processor of the present invention employs an internal write buffer 17 shown in FIG. 1. This buffer operates in a well-known manner to store data and addresses for writing to external memory except as discussed below. Additionally, the invented processor is adapted to operate with an external buffer 78 shown in FIG. 8. This buffer provides temporary storage for data intended to be written into the main memory 79. These buffers permit data to be written into the main memory when buses are not busy. The external buffer 78 provides a signal (EWBE\) on a line 88 (of FIGS. 11 and 13) indicating when the external write buffer is empty. The signal is shown coupled to the write ordering control circuit 120 on line 121 in FIG. 13. There is a similar signal IWBE\ coupled to circuit 120 on line 122 which indicates when the internal write buffer is empty.

There is an inherent problem when write buffers are used and where cache memories snoop as described above. This problem involves the ordering of data written to memory. It occurs, since from an external observer's standpoint, ("other" processor), access of a snooping cache is equivalent to main memory access. On the other hand, data in the write buffers (waiting to be written into main memory) is not seen as a main memory update. Consequently, any snooping cache with write buffers can cause a memory access ordering problem. The problem becomes more severe in a write-back protocol since consecutive writes cause worsening problems.

The present invention provides two distinct write ordering modes. One is referred to as the weak ordering mode and the other the strong ordering mode (SOM). The processor is locked into the strong ordering mode if the EWBE\ line is active during the last three clock cycles of the reset period, otherwise the weak ordering mode is engaged. To change modes requires resetting. A SOM bit is placed in an internal control register so that the software is able to check the ordering mode. Referring to FIG. 13, the circuit 120 receives the reset signal and examines line 88 during the reset period to determine if the strong ordering mode or weak ordering mode is selected.

In the weak ordering mode, writes to cache are permitted even with data in the buffers. When a modified line is flushed from the data cache, the processing unit examines pending write cycles in the write buffer for data associated with the same line. If such data is found, it is invalidated. Consequently, in the weak ordering mode, the modified line contains the pending write data and a double-store is prevented. As will be seen from the following discussion, this is in contrast to the operation of the strong ordering mode.

Referring to FIG. 11, blocks 102 through 107 demonstrate the overall operation during the strong ordering mode. First assume that a processor requests a write cycle as shown by block 102. Furthermore, assume a miss occurs in that processors cache memory as shown by block 103. Next, it is assumed that the data is written into the external buffer 78 as shown by block 105. For these conditions the EWBE\ signal is high. Now further assume, as shown by block 106, that the same processor or another processor requests a write cycle and a hit occurs in its cache memory as shown by block 106 and 107. When the hit occurs, the processor determines whether there is data in the external write buffer by sensing the EWBE\ signal, and additionally determines whether there is data present in its internal write buffer by sensing the IWBE\ signal as shown by block 108. If either signal is high as it is for the described conditions, the processor is stopped as shown by "FREEZE PU" in block 109. The cache memory is not updated until all the data has been written into the main memory from the external write buffer and internal write buffer as shown by block 110. If the internal and external buffers are empty, the cache may be updated as shown by block 111.

All buffers must be empty before the requested write proceeds to update the cache. The internal check is done since "M" data in the cache may be flushed from the cache to the main memory before an earlier write associated with a miss reaches the external write buffer.

As mentioned, the updating of the cache associated with the hit shown for block 107 is not written into cache until the buffers are empty and additionally, until the data associated with this hit is safely stored in external memory. This is done to avoid having the line invalidated during the period in which the processor waits for the write buffers to be emptied.

Consider the following example: first assume the write buffers are empty. A line of data in one of the cache memories is in the "M" state with its virtual tag in the "T" state. A first write cycle hits the physical tag of this line and therefore the data cache is updated and the data is also placed on the external bus. Assume now that for a second write cycle a bit occurs for this modified line, however, the data is not written into cache memory since it must first be written to the external memory in order to assure strong ordering. Now assume that a hit occurs to the modified line as a result of snooping, causing the line to be flushed from the data cache to the external memory thereby bypassing the previously mentioned two pending write cycles. The line is written back containing the first write data but not the second write data and the entry in the data cache is invalidated. The data associated with the first write is identified as a double-store and the request is aborted. The second write request is identified as a new store and proceeds after the line flush. The data associated with the second write continues to look up the data cache and as the line is now in the invalid state, after the external write is completed, the internal request is aborted.

Referring to FIG. 13, the outline of the processor is shown by line 125. As mentioned, the EWBE\ signal is coupled to the circuit 120 on line 88 and the internal write buffer empty signal IWBE\ is coupled to the circuit 120 on line 122. The circuit also receives an input which indicates when a hit occurs within the cache memory and a signal to indicate a write cycle. If strong ordering is selected, and when a hit occurs for a write cycle with the buffers not empty, the processing unit 15 is frozen as shown by the signal on line 124. As previously described, once the buffers are empty, the circuit 120 releases the processing unit 15 and the write to the cache memory is permitted.

Thus, an improved cache memory and associated circuits have been described which are particularly useful in a microprocessor where the cache memory is formed on a single substrate along with the processing unit and related units.

We claim:

1. A computer system which maintains cache coherency comprising:

a main memory;

first and second microprocessors, each being fabricated on a single chip and incorporating an associated cache memory that stores lines of data, with each line of data including protocol bits which indicate a protocol state;

a shared bus coupled to the first and second microprocessors and to the main memory;

the first and second microprocessors each further including:

an output address strobe pin;

an external address strobe pin;

a protocol selection pin which allows user selection of a cache coherency protocol;

in a first system configuration the output address and external address strobe pins of the first microprocessor being coupled to the external address and output address strobe pins, respectively, of the second microprocessor, the first system configuration enabling the first microprocessor to snoop memory cycles to the main memory initiated by the second microprocessor, and vice versa.

2. The computer system of claim 1 wherein the cache coherency protocol is selected by the protocol selection pin from the group consisting of write-back, write-through, and write-once protocols.

3. The computer system of claim 2, wherein the first system configuration is consistent with the writeonce protocol, and the protocol state of a line of data may be modified (M), exclusive (E), shared (S), or invalid (I).

4. The computer system of claim 2 wherein the first and second microprocessors each further include a write/read (W/R) pin which indicates whether a memory cycle is a read or a write cycle, and an invalidate input pin, when a microprocessor snoops an externally sensed address on the shared bus and the invalidate input pin is asserted, the snooping microprocessor placing the data in its associated cache memory in the I state.

5. The computer system of claim 4 wherein in the first system configuration the W/R pin of the first microprocessor is coupled to the invalidate pin of the second microprocessor, and vice versa.

6. The computer system of claim 5 wherein the first and second microprocessors each include a hit pin which is asserted by a microprocessor when a hit to its associated cache memory occurs during snooping of an externally sensed address.

7. The computer system of claim 6 wherein in the first system configuration, the hit and protocol selection pins of the first processor are coupled to the protocol selection and hit pins, respectively, of the second microprocessor.

8. The computer system of claim 3 wherein in a second system configuration the protocol selection terminal is coupled to a first potential.

9. The computer system of claim 8 wherein the second system configuration is consistent with the write-through protocol.

10. The computer system of claim 3 wherein in a third system configuration the protocol selection terminal is coupled to a second potential.

11. The computer system of claim 10 wherein the third system configuration is consistent with the write-back protocol.

12. The computer system of claim 1, wherein the first and second microprocessors comprise reduced instruction set computers (RISC).

13. The computer system of claim 1 wherein the associated cache memories comprise 4-way, set associative cache memories.

14. The computer system of claims 1, 2, 3, 4, 5, 6, 7, 12, 13, 8, 9, 10, or 11 further comprising a bus arbitrator coupled to the first and second microprocessors via the shared bus, the bus arbitrator preventing the first microprocessor from reading a data line at a certain address in the main memory until after the second microprocessor, which contains the data line in the M state at the certain address, updates the main memory.

15. A method of maintaining cache coherency in a computer system which includes a first processor incorporating a first cache on a single chip, a device having a second cache, a main memory, and a shared bus for transferring information between the first processor, the device, and the main memory, the first and second caches each storing lines of data, with each line of data having protocol bits associated therewith, the protocol bits indicating a protocol state, wherein the protocol state of a data line is selected from the group consisting of modified (M), exclusive (E), shared (S), or invalid (I) states, the method comprising the steps of:
 (a) selecting a first cache coherency protocol for the first processor unit by applying a first potential to a protocol selection pin of the first processor;
 (b) issuing a first memory cycle by the first processor to a first address in the main memory in accordance with the first cache coherency protocol;
 (c) selecting a second cache coherency protocol for the first processor by applying a second potential to a protocol selection pin of the first processor;
 (d) issuing a second memory cycle by the first processor to a second address in the main memory in accordance with the second cache coherency protocol.

16. The method of claim 15 wherein the first cache coherency protocol is write-through and the second cache coherency protocol is write-back.

17. The method of claim 15 wherein the first memory cycle is a read cycle and further comprising the steps of:
 (e) storing data retrieved from the main memory in the first cache in the data line corresponding to the first address;
 (f) changing the state of the data line in the first cache to the S state.

18. The method of claim 16, wherein the device comprises a second processor and the second memory cycle is a write cycle.

19. The method of claim 18 further comprising the additional steps of:
 (e) snooping, by the second processor, the second address containing a data line;
 (f) causing the data line associated with the second address of the second processor to assume the I state.

20. The method of claim 15 wherein the first cache coherency protocol is write-through and the second cache coherency protocol is write-once.

21. The method of claim 20 wherein the device comprises a second processor and the second memory cycle is a read cycle, the method further comprising the step of:
 (e) snooping, by the second processor, the second address, the second processor containing a data line associated with the second address in the E state.

22. The method of claim 21 further comprising the steps of:
 (f) reading the data line associated with the second address into the first cache in the S state;
 (g) changing the E state of the data line associated with the second address in the second processor to the S state.

23. The method of claim 20 wherein the device comprises a second processor, and further comprising the additional steps of:
 (e) snoopings, by the second processors, the second address, the second processor containing a data line associated with the second address in the M state;
 (f) backing-off reading the data line associated with the second address by the first processor;
 (g) updating the main memory by the second processor; and
 (h) allowing the first processor to read the data line associated with the second address.

24. A computer system which maintains cache coherency comprising:
 a main memory;
 a memory bus coupled to the main memory;
 a first microprocessor coupled to the memory bus, the first microprocessor incorporating a cache that stores lines of data, with each line of data having protocol bits associated therewith, the protocol bits indicating a protocol state, the first microprocessor further including a protocol selection pin that allows a user to select a data coherency protocol for the computer system from a plurality of protocols, the microprocessor accessing the cache and main memory according to the data coherency protocol selected.

25. The computer system of claim 24 wherein the plurality of protocols comprises write-back and write-through protocols.

26. The computer system of claim 24 wherein the plurality of protocols comprises write-back, write-through, and write-once protocols.

27. The computer system of claim 25 further comprising:
a second microprocessor also having a protocol selection pin and a cache, the first and second microprocessors each including an output address strobe pin and an external address strobe pin, in a first system configuration the output address and external address strobe pins of the first microprocessor being coupled to the external address and output address strobe pins, respectively, of the second microprocessor, the first system configuration enabling the first microprocessor to snoop memory cycles to the main memory initiated by the second microprocessor, and vice versa.

28. The computer system of claim 27 wherein the first system configuration is consistent with the write-once protocol, and the protocol state of a line of data may be modified (M), exclusive (E), shared (S), or invalid (I).

29. The computer system of claim 28 wherein the first and second microprocessors each further include a write/read (W/R) terminal which indicates whether a memory cycle is a read or a write cycle, and an invalidate input terminal, when a microprocessor snoops an external sensed address on the shared bus and the invalidate input terminal is asserted, the snooping microprocessor placing the data in its associated cache memory in the I state.

30. The computer system of claim 29 wherein in the first system configuration the W/R terminal of the first microprocessor is coupled to the invalidate terminal of the second microprocessor, and vice versa.

31. The computer system of claim 30 wherein the cache comprises a four-way set associated cache memory.

32. The computer system of claim 27 wherein the first and second microprocessors each include a hit pin, the hit pin being asserted responsive to a cache hit during snooping of an externally sensed address.

33. The computer system of claim 32 wherein in the first system configuration, the hit and protocol selection pins of the first processor are coupled to the protocol selection and hit pins, respectively, of the second microprocessor.

* * * * *